United States Patent
Stewart et al.

(10) Patent No.: US 6,201,794 B1
(45) Date of Patent: *Mar. 13, 2001

(54) NETWORK WITH EFFICIENT MESSAGE ROUTING

(75) Inventors: Brett B. Stewart; Paul R. Teich, both of Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/915,767

(22) Filed: Aug. 21, 1997

Related U.S. Application Data (60) Provisional application No. 60/039,424, filed on Mar. 7, 1997.

(51) Int. Cl.[7] ............................ G01R 31/08; H04L 12/56; H04M 7/00
(52) U.S. Cl. ....................... 370/248; 370/255; 370/351; 370/408; 379/221; 709/239
(58) Field of Search ....................... 370/248, 249, 370/254, 255, 351, 389, 400, 401, 408, 237, 260, 376; 709/238, 243; 379/201, 221, 34, 136; 707/8

(56) References Cited

U.S. PATENT DOCUMENTS

| | | | |
|---|---|---|---|
| 3,705,523 | * 12/1972 | Alouisa | 379/221 |
| 4,032,719 | * 6/1977 | Blasbaig | 370/376 |
| 5,212,789 | * 5/1993 | Rago | 707/8 |
| 5,475,732 | * 12/1995 | Pester, III | 379/34 |
| 5,491,695 | * 2/1996 | Meagher et al. | 370/260 |
| 5,559,877 | * 9/1996 | Ash et al. | 379/221 |
| 5,570,466 | * 10/1996 | Oechsle | 709/238 |
| 5,613,069 | * 3/1997 | Walker | 709/238 |
| 5,703,940 | * 12/1997 | Sattar et al. | 379/201 |
| 5,721,820 | * 2/1998 | Abali et al. | 709/243 |
| 5,757,895 | * 5/1998 | Aridas et al. | 379/136 |
| 5,805,593 | * 9/1998 | Busche | 370/396 |

* cited by examiner

Primary Examiner—Hassan Kizou
Assistant Examiner—John Pezzlo
(74) Attorney, Agent, or Firm—Foley & Lardner (57) ABSTRACT

Pilot messages are transmitted between communicating nodes on a network either periodically or as a continuous background process in order to determine the most efficient path for transmitting a message from a node to every other node in a network depending on prevailing message traffic conditions. Each node can transmit pilot messages at predetermined intervals or in response to commands from a master riding node. A master riding node can monitor message traffic and alter the sequence in which pilot messages are transmitted, thereby more frequently monitoring traffic between nodes with heavy communication requirements. By routing messages from a source node to a destination over a predetermined efficient path, it is no longer necessary for the system to determine a next destination point as messages traverse the network.

21 Claims, 6 Drawing Sheets

NETWORK WITH EFFICIENT MESSAGE ROUTING

This application is based on provisional application 60/039,424 filed Mar. 7, 1997.

BACKGROUND OF THE INVENTION

1. Field of the Invention

The invention deals with systems in which data is communicated among a plurality of devices, and in particular with methods and apparatus for routing data on such systems.

2. Related Art

Figure 1:
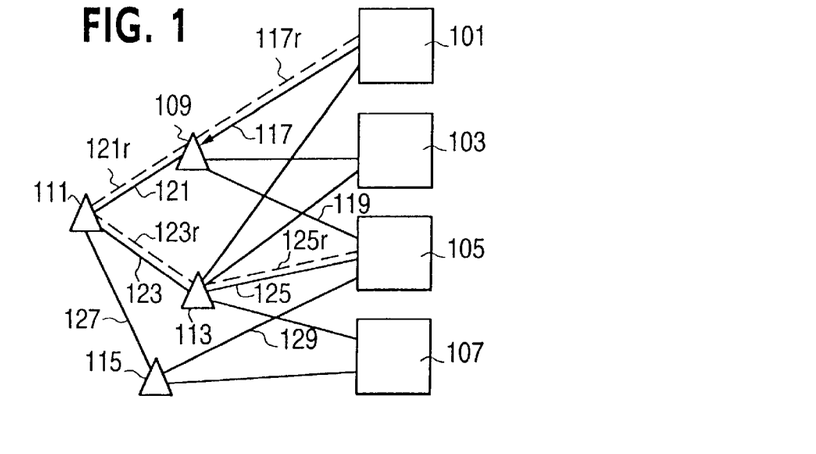
FIG. 1 illustrates a network with a plurality of devices and information transfer points.

Systems which communicate data from one device to another typically route the data from a source to a destination along a route determined independently each time data is transmitted or determined in advance irrespective of dynamic traffic loads on a network. Such systems generally give no consideration to how data has previously been routed. For example, FIG. 1 illustrates an arbitrary configuration of a network with devices 101, 103, 105, and 107. The devices communicate over lines connected to information transfer points 109, 111, 113, and 115. In routing a message from device 101 to 105, several options are available. For example, a message can leave device 101 on signal line 117 and at node 109 be transferred to signal line 119 for routing to device 105. Alternatively, at node 109 the message can be routed on signal line 121 to node 111, which then transmits the message on signal line 123 to node 113 for transmission on line 125 to node 105. Alternatively, node 111 can transmit the same message on signal line 127 to node 115, which passes the message on signal line 129 to node 105. Other alternative paths may also be available, depending on the present traffic on the network. As networks become more sophisticated involving additional devices and data transfer points, the routing decisions become more complex.

Conventionally, device 101 transmits its message using some method to determine an available transmit path to device 105 without any significant consideration of where device 105 is located on the network. Typically, device 101 looks for an available transmit path and leaves it up to device 105 to recognize the message and respond. Device 105 may receive the message quickly or slowly depending on the traffic and the route taken. If the message travels a circuitous route, its presence on the network consumes bandwidth that can be better utilized for other purposes. Thus, conventional systems which route information based on the availability of transmission resources at each of the data transfer points alone, may be highly inefficient.

SUMMARY AND OBJECTS OF THE INVENTION

In view of the above, it is an object of the invention to route a message from a first device to a second device over a known relatively efficient route.

It is another object of the invention to provide a method for identifying such relatively efficient routes.

It is a still further object of the invention to delay data transmission from a device until a predefined relatively efficient route becomes available, where using the available route is more efficient than transmission of the information on the first available transmission medium.

The above and other objects of the invention are accomplished by an information communication network with a plurality of nodes. At least one node of the plurality transmits a route determining message recognizable by another node in the plurality. The node transmitting the message records a path taken by the route determining message to the other node and routes subsequent messages over that path.

Another feature of the invention is that the route determining message can acquire routing tags indicative of points on a route taken through the network by the route determining message from the transmitting node to the destination node.

The routing tags can be stored in a memory so that subsequent messages from the first to the second node are passed through the points indicated by the routing tags.

The system according to the invention can also employ a master routing node in which the master routing node provides information for all nodes in the network. The master routing node can monitor message traffic as a background process by transferring messages to other nodes and receiving corresponding responses indicative of the route taken. Depending on the traffic and the routes taken by the messages transmitted as part of the background process, the master routing node can update information stored in the routing memory. Routing can be conducted by the master node or the routing memory can be distributed among the nodes using information sent by the master node. The master node can conduct the background processing for routing determination either at predetermined times or as a continuing background process. Moreover, the background process can be repeated for predetermined nodes more frequently at predetermined times, depending on the traffic pattern. For example, nodes which transmit information more frequently for a particular application can be monitored more often in the background process.

BRIEF DESCRIPTION OF THE DRAWINGS

The above and other objects of the invention are accomplished by the invention described herein with reference to the drawings listed below.

DETAILED DESCRIPTION OF THE PREFERRED EMBODIMENTS

In a system according to the invention, pilot messages are transferred among multiple nodes attached to each other through a network including information transfer points at which the message can be routed in a plurality of directions. The route traversed by the pilot message is monitored and reported back to the first node or, in another embodiment, to a control node.

Figure 2:
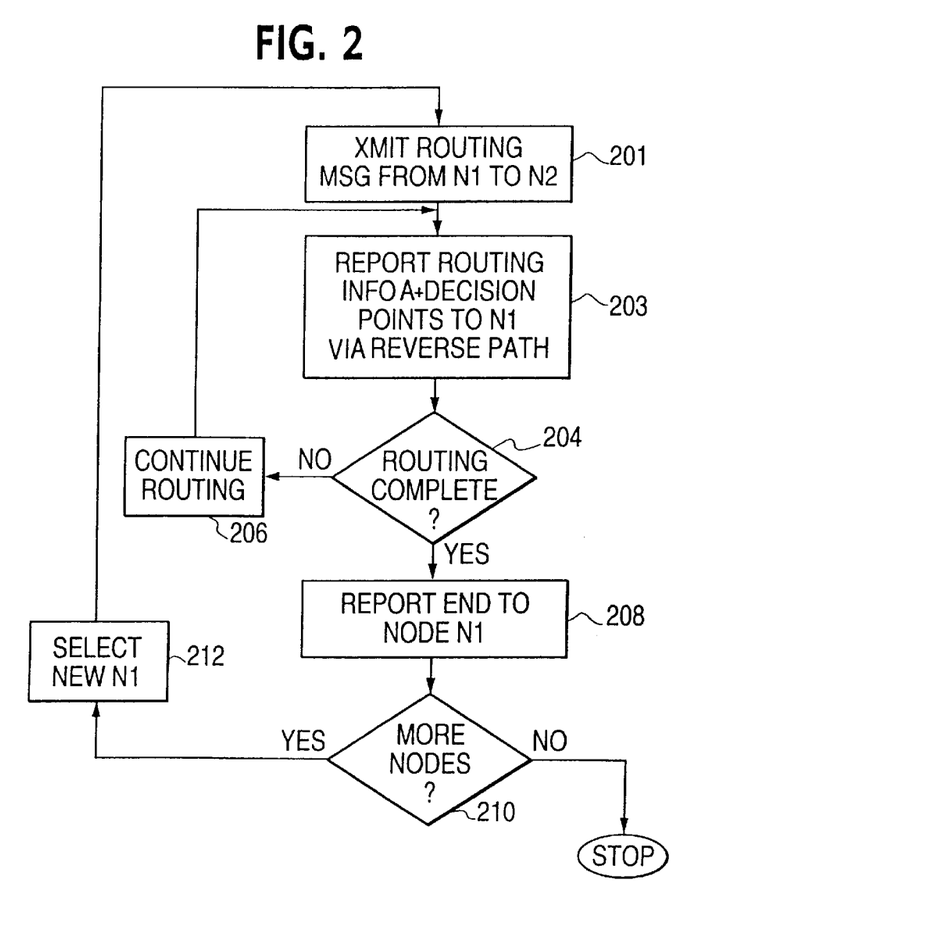
FIG. 2 is a flow diagram of an embodiment reporting routing information of each decision point, according to the invention.

FIG. 2 illustrates an embodiment according to the invention in which at step 201 a routing or pilot message is transmitted from a first node N1 to a second node N2. As illustrated in FIG. 1, a message from N1 to N2 encounters information transfer points or routing points such as points 109, 111, 113, and 115, as it traverses the network. For example, where node N1 is node 101 and node N2 is 105, the message will first encounter information transfer point 109. Based on the message traffic conditions and other priorities, as may be programmed by the user, a decision is made at information transfer point 109 on how best to route the message to its destination at that point. This differs from conventional methods wherein a static a priori routing preference is chosen among many choices. Such a priori determination is typically made based on the cost of using a particular network link for a route segment. Therefore the maintenance of the a priori decisions in a network where the link costs change are a difficulty overcome by the present invention. Additionally, the present invention contemplates making dynamic decisions about routes based on instantaneous network load, reliability, and other factors.

In step 203 in FIG. 2, the routing information is reported back to node N1 over a reverse transfer path shown by dashed line 117r in FIG. 1. The return channel 117r may be coincident with transmit channel 117 if channel 117 is a bidirectional line or channel 117r may be a physically separate line.

In step 204, the message routing is examined to determine if the routing is complete. This test can take place either at the information transfer decision point 109 or at the originating N1 node 101. If the routing is not complete, the message routing continues as shown in step 206. The message is then routed to the next information transfer point and steps 203, 204 and 206 are repeated until the message routing is complete. FIG. 1 shows a message being routed through information transfer point 109 on signal line 121 to information transfer point 111 and then on signal line 123 to information point 113. At information point 113, the message is transmitted on signal line 125 to node 125, which represents node N2.

At each step in the progression of information transfer points, the path taken by the message is reported back on a reverse channel to node N1, in this case node 101. When the routing has been completed, that information is reported to node N1 as shown in step 208. In step 210 the system is tested to determine if more nodes exist. If so, a new value of node N1 is set and the process repeats until message routing between all pairs of nodes is determined. Each node 101, 103, 104, 105, 107 stores its routing information in the memory and subsequently routes message according to the routing information to the destination stored in the node.

Figure 3:
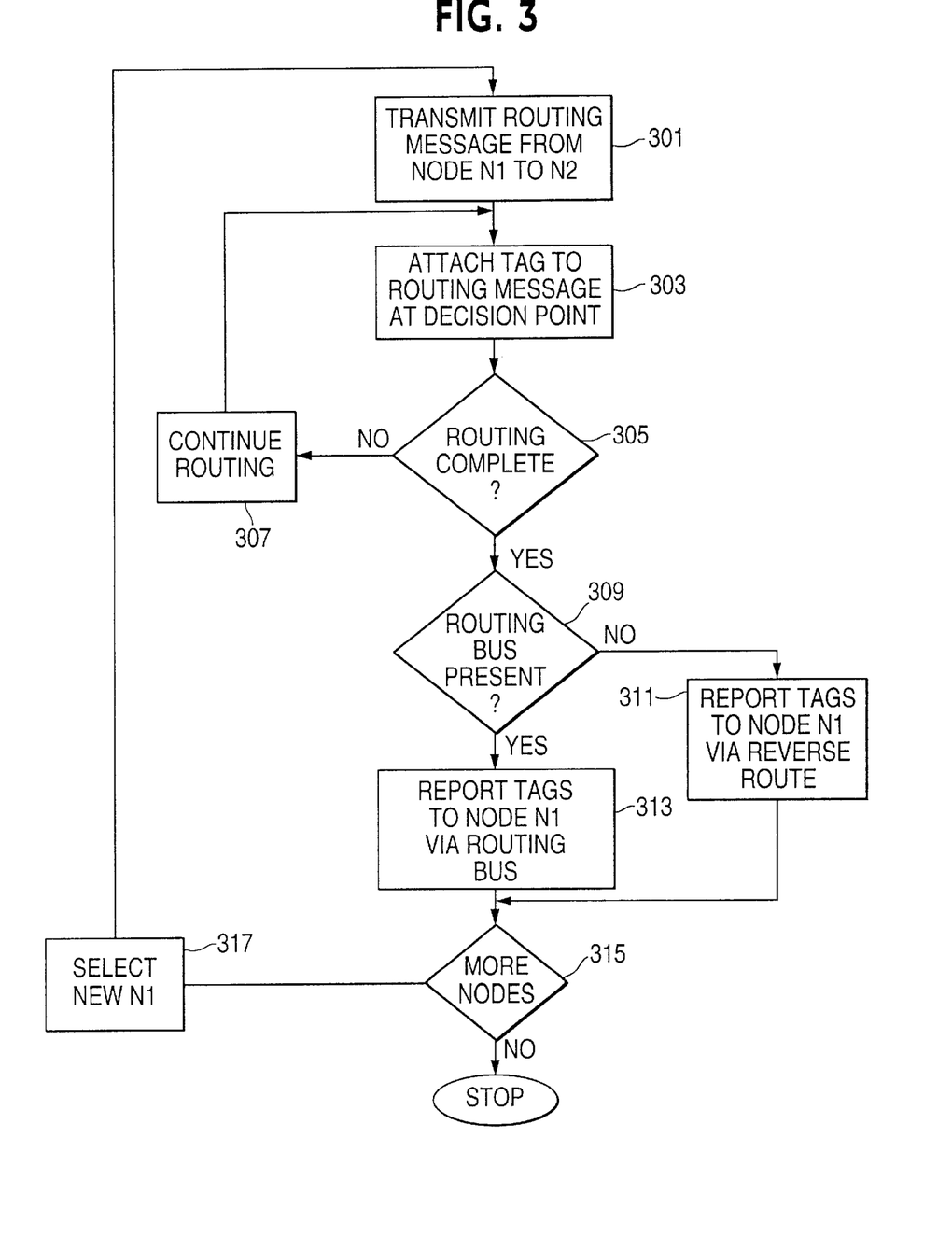
FIG. 3 is a flow diagram on which routing tags are attached to a message and reported to the originating node, according to the invention.

FIG. 3 is a flow diagram illustrating an alternative approach to informing node N1 of the path a routing or pilot message takes from node N1 to node N2. In step 301 the routing message is transmitted from node N1 on its way to node N2. Step 303 occurs at each information routing decision point in the network. In step 303 a decision point identifier or tag is attached to the routing message. If the message has not arrived at its destination as determined in step 305, routing continues in step 307 and the next information routing decision point is attached to the message. Steps 303, 305 and 307 are then repeated until the routing message has reached the destination node N2. At this point, it is necessary to report the routing information back to node N1 for storage therein.

Figure 4:
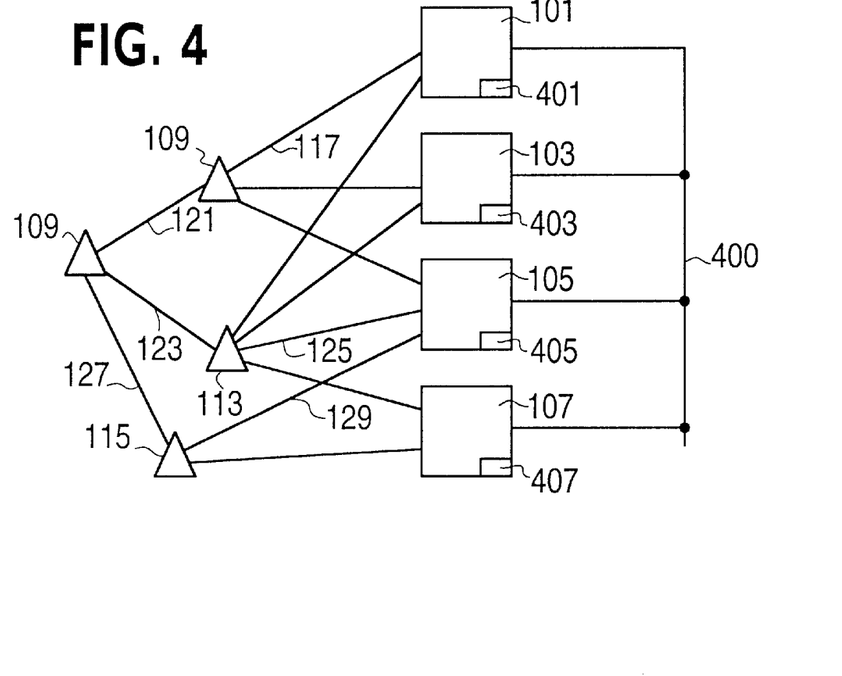
FIG. 4 illustrates a system according to the invention with a routing bus.

In one embodiment, the routing information can be reported to node N1 simply by traversing the route taken by the message in the reverse direction, as previously discussed. FIG. 4 shows an alternative configuration in which nodes 101, 103, 105 and 107 are routed via routing bus 400. This routing bus serves as a dedicated channel for transmitting the routing information to be stored in memories 401, 403, 405 and 407, respectively.

Referring now to FIG. 3, step 309 determines whether such a routing bus is present in the system. If not, in step 311, the routing information is reported to node N1 via the reverse route as shown in step 311. When a routing bus is present, the tags are reported to node N1 via the routing bus, as shown in step 313. Step 315 is a test of whether more nodes remain in the network to transmit routing messages. If so, in step 317, a new node N1 is selected and the process is repeated until all nodes have transmitted routing messages. When all nodes have transmitted routing messages and stored routing information, the process stops in step 319. Each node now contains a complete list of routes to be taken for messages from that node to other nodes. Thus, subsequent messages will be transferred along those routes.

Figure 5:
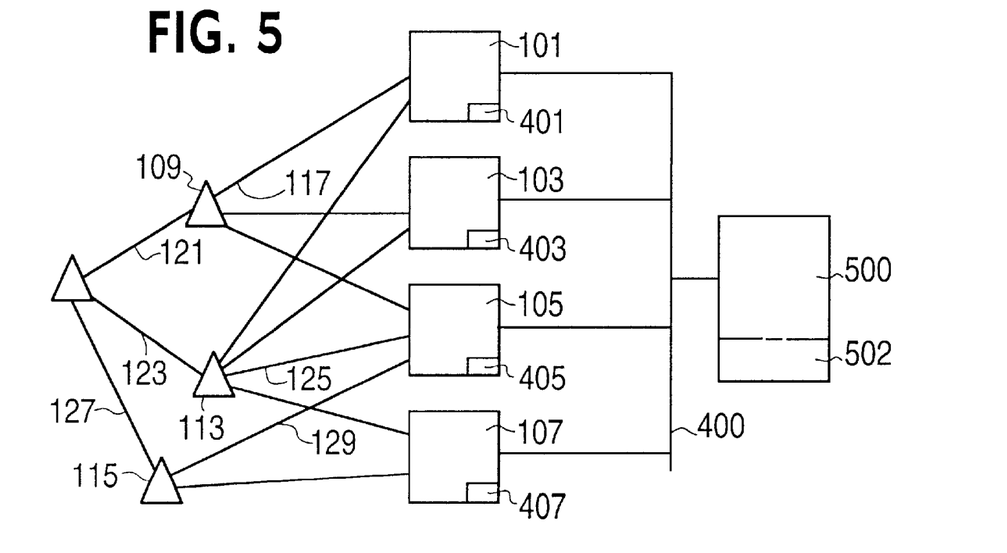
FIG. 5 illustrates an embodiment according to the invention with a master routing node.

FIG. 5 illustrates a system according to the invention with a master routing node 500 shown connected to routing bus 400. It should be noted that the functions performed by the master routing node 500, as discussed herein, could be distributed among nodes 101, 103, 105 and 107 with or without the presence of routing bus. However, the master routing node 500 and routing bus 400 simplify system configuration.

Another function according to the invention that can be performed by master routing node 500 is that of monitoring information traffic on the network and adapting to changing message patterns. For example, where a portion of an application creates an unusually high concentration of message traffic between nodes 103 and 105, it may be useful to alter the message traffic pattern between devices while this portion of the application executes. Master routing node 500 may include a memory 502 which stores the routing information for each node. Alternatively, master routing node 500 may transmit the routing information for each node to memories 401, 403, 405 and 407. According to the invention, control of pilot or routing message transmission lies within the purview of the master routing node 500. The master routing node can direct transmission of such messages periodically from each node either at fixed times or as a continuous background process.

Figure 6:
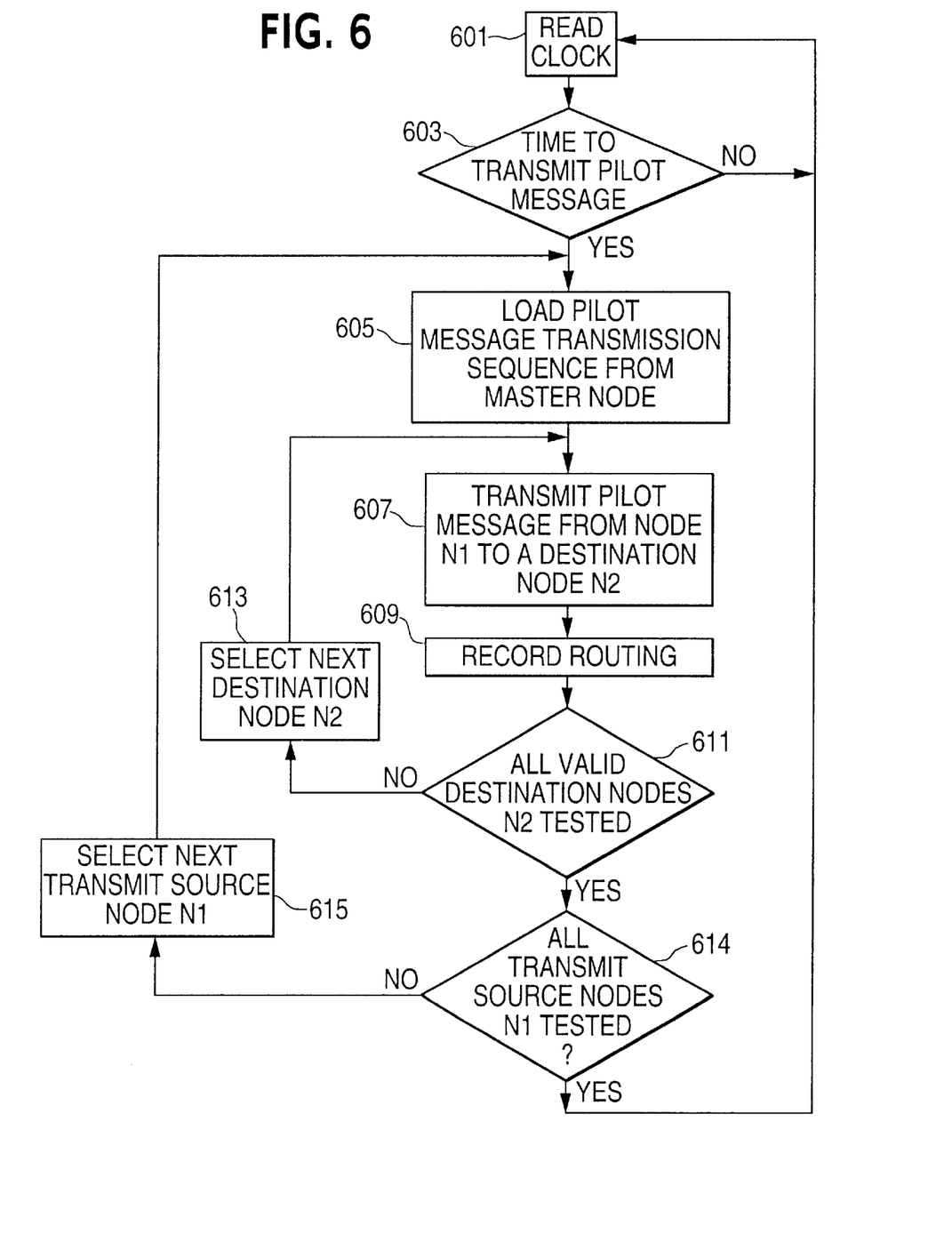
FIG. 6 is a flow diagram illustrating a sequence of steps in a system with the master routing node.

FIG. 6 illustrates how the master routing node conducts this process. In steps 601 and 603 a clock is read and it is determined if it is time to transmit a pilot message. If not, the process repeats until the time to transmit a pilot message is detected. At this point, at step 605 the master node loads the pilot message transmission sequence into nodes 101, 103, 105 and 107. The pilot message sequence can be preloaded into the master routing node or the master routing node can select a pilot message transmission sequence based on the program being executed. One advantage of the pilot message transmission sequence being determined by the master routing node is that different message sequences can be used for different applications or portions of applications, based on anticipated message traffic patterns.

In step 607 the pilot message is transmitted from the first source node N1 to a destination N2 and in step 609 the routing is recorded. Step 611 determines whether all valid destination nodes N2 have been tested. If not, control is transferred to step 613 which selects the next destination of N2 and steps 607, 609 and 611 are repeated. Once all valid destination nodes N2 have been tested, as determined in step 611, the next source node N1 in the message transmission sequence can be selected in step 615, if all source nodes N1 have not been tested as determined in step 613. In this case, the process repeats until all source nodes have been tested.

Figure 7:
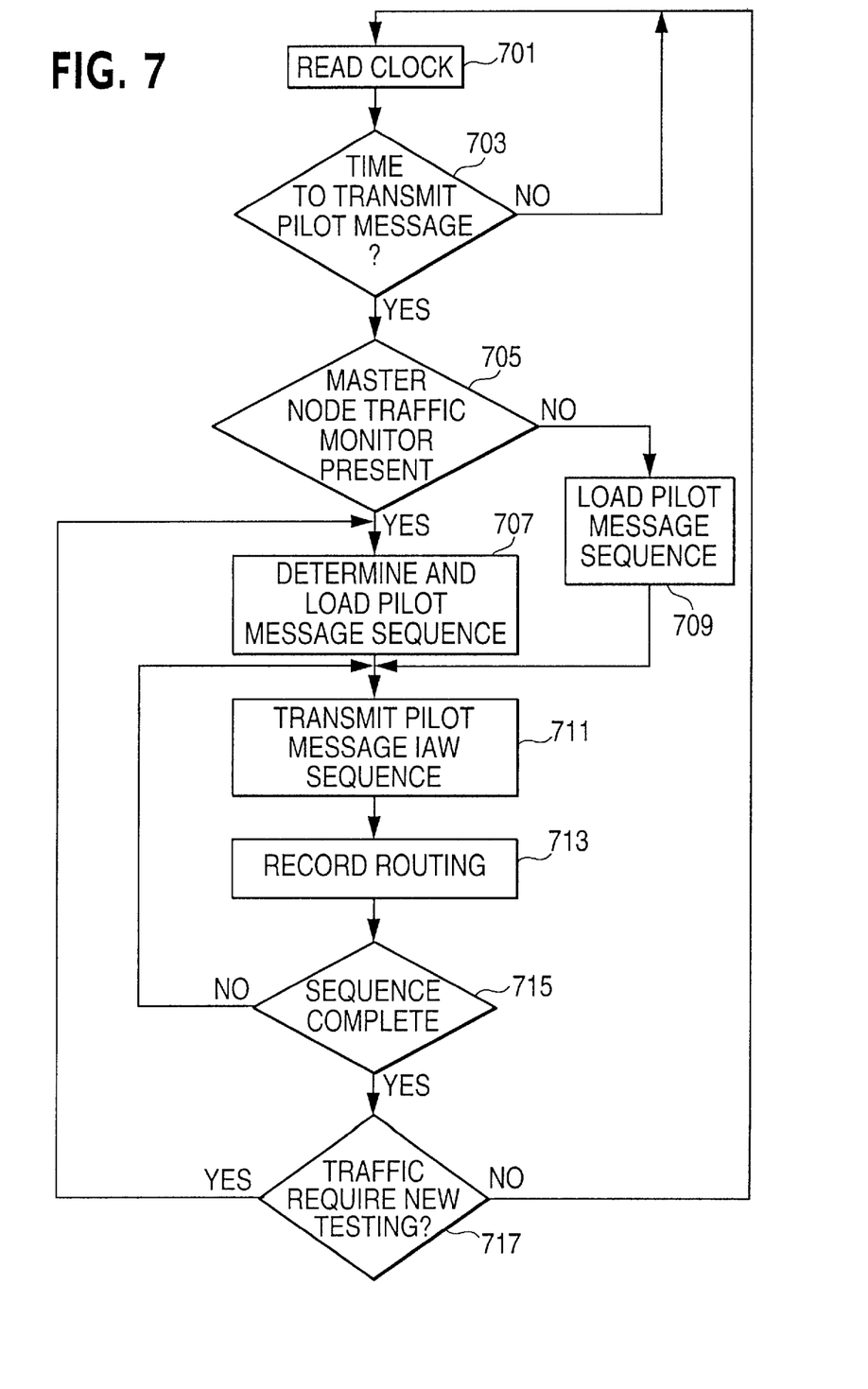
FIG. 7 is a flow diagram illustrating a sequence of steps in a system according to the invention in which a master control node monitors message traffic.

FIG. 7 illustrates a process followed when master routing node 500 actively monitors information traffic on the network. Information traffic can be monitored in any number of ways. For example, the master routing node could simply look for levels of energy on traffic lines leading into each node. Alternatively, the master routing node 500 could monitor the level of activity at information switching decision points, e.g. 109, 111, 113, 115.

In a third traffic monitoring approach, master routing node 500 continuously sends pilot messages in a sequence determined by the traffic flow and monitors the amount of time it takes for the pilot message to traverse the network. Longer amounts of time indicate a higher level of activity on the network. In addition, longer periods of time to transmit a pilot message between particular nodes is an indication that those particular nodes are busier than other nodes in the system. In such circumstances, it may be useful for the master routing nodes to be programmed to test those nodes more frequently in order to determine when the message traffic parameters change.

FIG. 7 illustrates the sequence. Steps 701 and 703 are executed until it is time to transmit a message. If the master node has a traffic monitor present, as determined in step 705, in step 707 the master routing node 500 determines and loads the pilot or routing message sequence. If the master node does not monitor traffic, in step 709 the pilot message sequence is loaded from the master node to the individual nodes, e.g. 101, 103, 105 and 107. In either case, in step 711 the pilot messages are transmitted in accordance with the sequence and in step 713 the routing is recorded. If the sequence of pilot messages is not complete, as determined in step 715, steps 711, 713 and 715 are repeated. When the sequence is complete, step 717 can be executed to determine if message traffic requires additional testing through a new pilot message sequence. If so, control returns to step 707 and the process repeats. If not, as would be the case where the traffic is relatively constant or the master node does not monitor message traffic, controls return to step 701.

Figure 8:
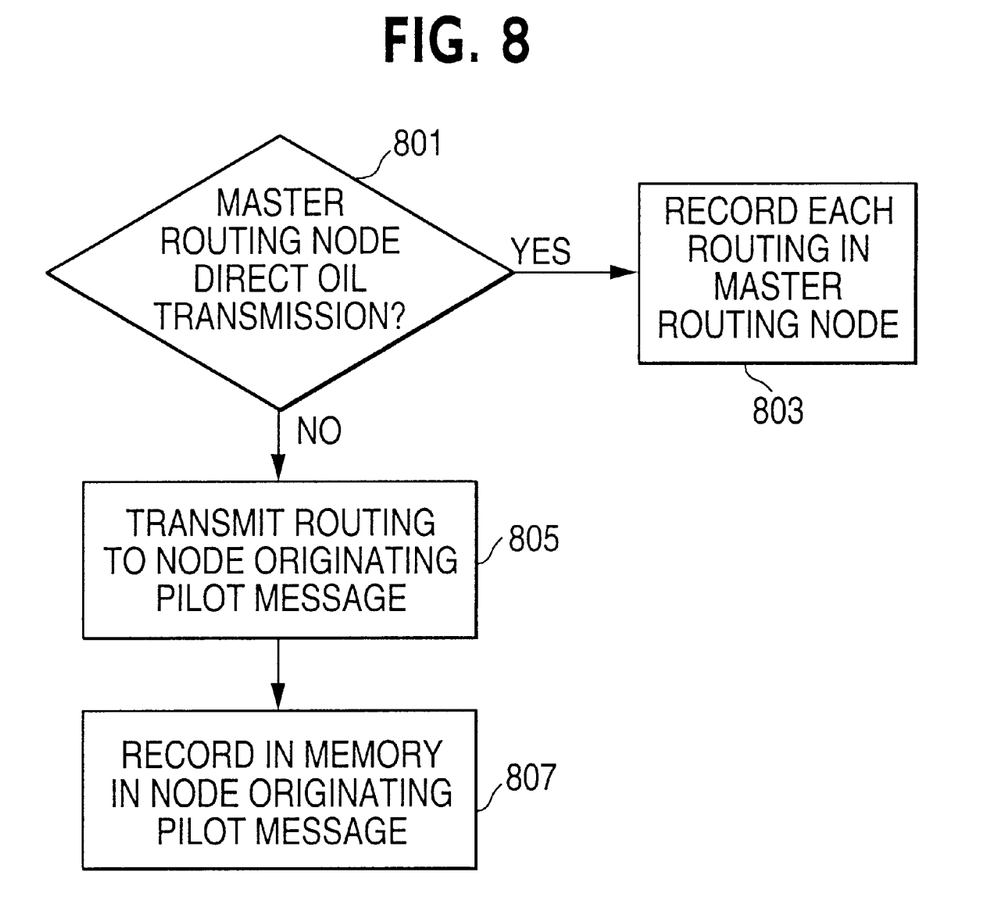
FIG. 8 is a illustration of the routing step in FIGS. 6 and 7.

Both steps 609 and 713 recite recording the routing information. FIG. 8 illustrates alternatives in recording the routing information. In step 801, if it is determined that the master routing node directs all transmission of messages in the system, then the routing information for each node to every other node is stored in the master node, as shown in step 803. If the master node does not perform this function, as determined by step 801, then the routing information is transmitted to the node originating the pilot message, as shown in step 805. This could be accomplished using either a reverse path from the destination to the source node or using the routing bus 400, as previously discussed. In either case, when the routing information is received by the node originating the pilot message, in step 807, that node records in its memory the routing information for messages to the destination node from that source.

In a system according to the invention, each node, including the master routing node, has processing and memory capabilities necessary to perform its individual functions. Indeed, the functions performed by individual nodes, e.g. 101, 103, 105 and 107 are independent of the method and apparatus of intercommunication among the nodes, according to the invention. Master routing node 500 may have sufficient processing and memory capability to determine and implement the pilot message transmission sequence, to transmit the message path routing information to the individual nodes and, if desired, to store the message path routing information. Such functions can be implemented using conventional components. In addition, the functions of the master routing node 500 can be performed as a distributed function among all of the nodes, e.g. 101, 103, 105, 107, or any one of the nodes may be programmed to act as the master routing node. In another configuration, according to the invention, one or more of the individual nodes may serve as a backup master routing node in the event the master routing node 500 fails. This provides graceful system degradation. The backup functions can be performed by the nodes in a predetermined sequence or all nodes can be programmed to become the master routing node based on the first node to determine that the master routing node 500 is not present or no longer functioning.

In a system according to the invention, once the message routing from each node to every other node, messages are routed according to that path. This eliminates the need for message routing decisions to be made as a message traverses the network, thereby speeding message transfer. In addition, messages are always routed according to the most efficient routing as determined by the pilot messages. Periodic or continuous background processing of pilot messages allows routing information to be updated dynamically in response to current message traffic conditions. Thus, the method of determining and implementing message routing and the system according to the invention provide and enhanced system performance in routing messages between nodes.

While specific embodiments of the invention have been described and illustrated, it will be clear that variations in the details of the embodiments specifically illustrated and described may be made without departing from the true spirit and scope of the invention as defined in the appended claims.

What is claimed is:

1. An information communication network comprising:
   a plurality of nodes;
   a plurality of links;
   a plurality of transfer points each of which is connected to at least three different ones of said plurality of links, said plurality of transfer points each providing connectivity between a first of said at least three different ones and a second of said at least three different ones of said plurality of links so as to provide a part of a network connection between a first of said plurality of nodes and a second of said plurality of nodes, and
   a routing bus that couples said plurality of nodes to each other without usage of any of said transfer points;
   at least one node of said plurality of nodes transmitting a pilot signal recognizable by another node of said plurality of nodes, said one node recording a path taken by said pilot signal to said another node and routing subsequent messages to said another node over said path,
   said one node recording the path taken by said pilot signal based on a route determining message sent over said routing bus from said another node to said one node, said routing bus being a bus dedicated for passing said route determining message between said plurality of nodes,
   wherein said pilot signal acquires routing tags indicative of points on a route through said network taken by said pilot signal from said one node to said another node, said routing tags being stored in a memory so that a subsequent message from said one node to said another node is passed through said points indicated by said routing tags, wherein said one node transmitting said pilot signal comprises said memory, wherein said one node comprises a master routing node, and wherein all others of said plurality of nodes operate as backup master routing nodes in a particular hierarchical order, such that when said one node fails, one of said all others of said plurality of nodes having a highest priority is selected as a new master routing node.

2. An information communication network as recited in claim 1, wherein said memory in said master routing node stores routing information for all nodes of said network.

3. An information communication network as recited in claim 2, wherein said master routing node comprises a network message traffic monitor.

4. An information communication network as recited in claim 3, wherein said network message traffic monitor comprises message transmitting circuiting transmitting messages to specified other nodes of said networks and message receiving circuiting receiving corresponding responses indicative of said route taken as a background process.

5. An information communication network as recited in claim 4, wherein said master routing node updates information stored in said memory based on said background process.

6. An information communication network as recited in claim 5, wherein said background process is performed at predetermined times.

7. An information communication network as recited in claim 5, wherein said background process is repeated for predetermined ones of said nodes at predetermined times.

8. An information communication network as recited in claim 7, wherein said master routing node selects said predetermined ones of said nodes depending on selected message traffic statistics.

9. An information communication network as recited in claim 8, wherein said selected message traffic statistics include one of throughput, error rate, and up time.

10. An information communication network as recited in claim 5, wherein said background process is performed continuously.

11. An information communication network as recited in claim 10, wherein said background process is repeated for predetermined ones of said nodes at predetermined times.

12. An information communication network as recited in claim 11, wherein said master routing node selects said predetermined ones of said nodes depending on selected message traffic statistics.

13. An information communication network as recited in claim 1, wherein said route determining message is recognizably distinct from an information transferring message.

14. An information communication network as recited in claim 1, wherein said route determining message comprises an information transferring message.

15. An information communication network as recited in claim 1, wherein each individual node of said plurality of nodes transmits said route determining message.

16. An information communication network as recited in claim 15, wherein each individual node transmits said route determining message at a time determined by said individual node and receives an updated response indicative of said route.

17. An information communication network as recited in claim 16, wherein each said node updates said memory based on said updated response.

18. An information communication network as recited in claim 17, wherein said time is periodic.

19. An information communication network as recited in claim 15, wherein each individual node begins transmission of said Pilot signal simultaneously.

20. An information communication network as recited in claim 16, wherein said time is determined by said individual node based on message traffic of said node.

21. An information communication network as recited in claim 1, wherein said master routing node determines if said routing bus is currently operational, and if not, wherein said route determining message is sent from said another node to said one node along a same path as the pilot signal.

* * * * *